United States Patent

[11] 3,577,1

[72] Inventor David E. Sparks Chicago, Ill.

[21] Appl. No. 811,893

[22] Filed Apr. 1, 1969

[45] Patented May 4, 1971

[73] Assignee Zenith Radio Corporation Chicago, Ill.

[54] VARIABLE ATTENUATOR FOR A WAVE SIGNAL RECEIVER
9 Claims, 3 Drawing Figs.

[52] U.S. Cl. .......... 333/17, 333/81, 307/237

[51] Int. Cl. .......... H04b 3/04, H01p 1/22

[50] Field of Search .......... 307/237; 333/17, 81

[56] References Cited

UNITED STATES PATENTS

| | | | |
|---|---|---|---|
| 2,971,164 | 2/1961 | Saari .......... | 330/145 |
| 3,135,934 | 6/1964 | Schoenike .......... | 333/ |
| 3,153,189 | 10/1964 | Sweeney .......... | 333/ |
| 3,289,120 | 11/1966 | Anders et al. .......... | 33 |
| 3,325,754 | 6/1967 | Frisch et al. .......... | 33 |
| 3,464,036 | 8/1969 | Robinson et al. .......... | 333/ |

*Primary Examiner*—Herman Karl Saalbach
*Assistant Examiner*—T. Vezeau
*Attorneys*—Frances W. Crotty and James E. Tracy

ABSTRACT: Attenuation of a received carrier, such television signal, may be made dependent on the carı signal strength by means of a pi network of variable-resist diodes, the bias currents of which are controlled by an a matic gain control signal. The diodes in the two shunt arn the pi network are supplied with forward bias currents vary directly with received signal strength variations, whe each diode in the network's series arm receives forward current that changes inversely with signal strength variat In this way, the series arm resistance varies directly, whil resistances of the shunt arms vary inversely, with chang the carrier's signal strength.

PATENTED MAY 4 1971 3,577,103

Inventor
David E. Sparks
By James E. Tracy
Attorney

VARIABLE ATTENUATOR FOR A WAVE SIGNAL RECEIVER

BACKGROUND OF THE INVENTION

This invention relates to a novel variable attenuator, controlled by an automatic gain control signal, for subjecting an applied carrier to attenuation or suppression in an amount directly proportional to the carrier's signal strength. Although the invention finds utility in any wave signal receiver where it is desired to attenuate a carrier, either modulated or unmodulated, it is particularly useful in a television receiver to attenuate a received television signal before it is applied to the receiver's tuner and will be described in that environment.

Automatic gain control (or AGC) is ordinarily achieved in a television receiver by initially developing an AGC signal voltage whose magnitude varies in response to variations in the signal strength of the received television or RF signal. The AGC signal is then utilized to adjust the gain of the RF (or radio frequency) amplifier in the tuner, which will be of the superheterodyne type, and also the gain of at least one of the amplifiers in the IF (or intermediate frequency) amplifying channel to which the output of the tuner is coupled. The gains of the controlled amplifiers are increased as the strength of the television signal decreases, and decreased with increasing signal strength. Unfortunately, certain deleterious and undesirable effects may occur when the gain of an amplifying device (be it a transistor, vacuum tube, etc.) is altered. For example, the device's input capacity is subject to change and this in turn results in a modification of the frequency response characteristic of the overall amplifying system provided by the tuner and the IF channel.

To avoid any changes in operating characteristics as gain is regulated in accordance with RF signal strength, each of the amplifying stages in both the tuner and IF channel may be designed to operate at a fixed gain and a variable attenuator, controlled by the AGC signal, may be interposed between the receiver's antenna and the tuner's input. Amplitude reduction, by an amount correlated to signal strength, of the television signal before it is delivered to the tuner is effectively equivalent to (since it achieves the same result as) the more conventional controlled gain reduction of the RF and IF amplifiers. However, with pretuner attenuation the operating characteristics, such as frequency response, will remain fixed for all levels of signal strength and will not experience any change.

To be most effective, particularly when employed in a television receiver, such a variable attenuator preferably should be capable of introducing any selected level of attenuation ranging from essentially zero, for weak signal conditions, to at least 60 decibels in the presence of strong signals. Moreover, in order to obtain optimum signal transfer to the tuner and to stabilize its operating characteristics regardless of received signal strength, it is important that the value of the apparent internal output impedance of the attenuator be the same for all levels of attenuation imparted to the television signal. The input of the tuner must be driven by a signal source having a constant impedance. At the same time, the input impedance of the attenuator must match the impedance level of the incoming signal from the antenna to avoid signal reflections.

These performance requirements, as well as many others, are easily met by applicant's novel attenuator. It can be impedance matched to both its driving circuit as well as to its driven or load circuit with very little difficulty, and has design flexibility which allows simple modifications to adapt the attenuator for use in any operating environment. Furthermore, applicant's attenuator can operate over a wide band of frequencies, such as is covered by television signals, without introducing any distortion.

Accordingly, it is an object of the invention to provide a new and improved controllable signal attenuation circuit for a wave signal receiver.

It is another object to provide, for processing a carrie signal, a unique variable attenuator for introducing an at tenuation regulated in accordance with the strength of the car rier.

It is a further object to provide a variable attenuator, fo coupling a signal source to a load circuit, which may easily b arranged to represent to the load circuit a constant source im pedance for all levels of attenuation.

A further object is to provide a variable attenuator, fo coupling a signal source to a load circuit, which may represen to the source circuit a constant impedance regardless of at tenuation level.

It is another object to provide an attenuator whicl represents a constant impedance simultaneously to both it load and source.

An additional object of the invention is to provide, for a RF signal, a variable attenuator having a maximum attenua tion greater than that ordinarily obtainable with RF signal at tenuators.

SUMMARY OF THE INVENTION

The variable attenuator of the invention is to be incor porated in a wave signal receiver, such as a television receive for attenuating a received carrier in response to an automati gain control signal and in an amount directly proportional t the carrier's signal strength. In accordance with one aspect o the invention, the variable attenuator comprises a pi networ having at least one current-controlled variable resistanc diode in its series arm and also in each of its input and outpu shunt arms. The resistance of each diode is inversely propo tional to the magnitude of any forward bias current translate therethrough. There are three different DC paths each c which includes a respective one of the three arms of the ne work. Bias means, controlled by the automatic gain contr signal and including the DC paths, are provided for translatin through each of the diodes in the shunt arms forward bias cu rent that varies directly with received signal strength varia tions and for translating through each diode in the series ar forward bias current that changes inversely with receive signal-strength variations. Means are also included for appl ing the carrier across the input shunt arm and for deriving it i attenuated form across the output shunt arm.

DESCRIPTION OF THE DRAWING

The features of the invention which are believed to be nov are set forth with particularity in the appended claims. The i vention, together with further objects and advantages thereo may best be understood, however, by reference to the follov ing description in conjunction with the accompanying drawir in which:

DESCRIPTION OF THE ILLUSTRATED EMBODIMEN

Figures 1, 2, 3:
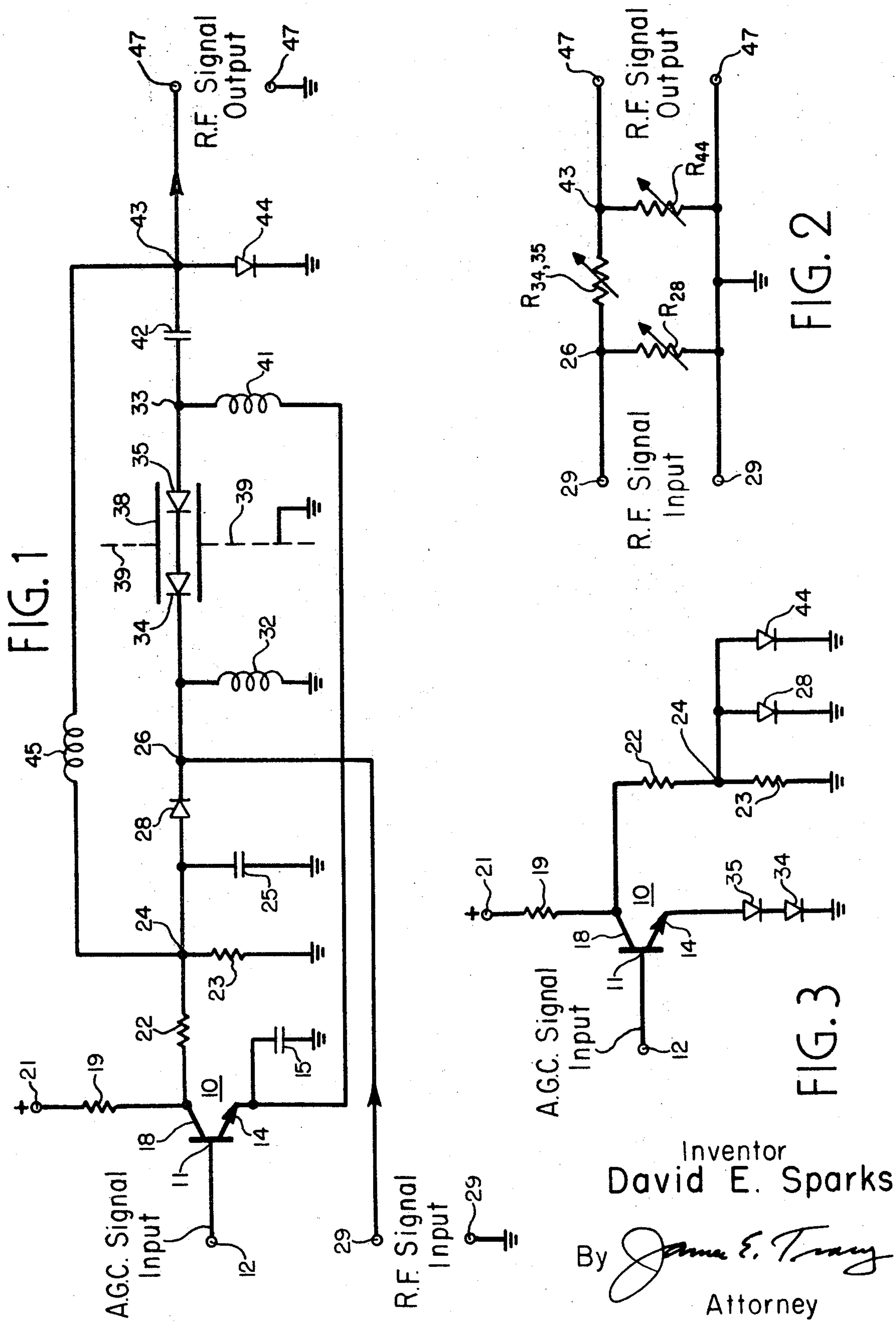
FIG. 1 is a schematic representation of a variable attenuat embodying the invention and illustrated in the environment a television receiver where the carrier constitutes an R signal, specifically a television signal.
FIG. 2 is the equivalent RF or AC circuit of the attenuat of FIG. 1.
FIG. 3 shows the attenuator's equivalent DC circuit.

Turning now to the circuit diagram of FIG. 1, the illustrat attenuator comprises a transistor 10 of the bipolar type a NPN gender. Its base 11 is connected to an input terminal to which is applied an AGC signal having an amplitude, f reasons to be understood, inversely proportional to t received signal strength. More specifically, the attenuator designed to function in response to the application on termin 12 of an AGC voltage which is always of positive polarity, gardless of signal strength, but decreases in magnitude as t strength of the RF signal increases. In other words, the AC potential is of maximum amplitude during weak signal con tions (when minimum attenuation is to be introduced) and minimum amplitude during the reception of relatively stro ' signals, at which time maximum attenuation is to be in- ›duced.

Γhe emitter 14 of transistor 10 is coupled via a capacitor 15 a ground plane of reference potential. The transistor's col- tor 18 is connected through a resistor 19 to the positive ter- nal 21 of a source of unidirectional or DC operating poten- l, the negative terminal of which is grounded. A pair of se- s-connected resistors 22, 23 connect collector 18 to ground d the junction 24 of those resistors is bypassed to ground ough a capacitor 25.

Junction 24 is also connected to a circuit terminal or junc- n 26 by way of a current-controlled variable resistance ›de 28. A characteristic of that type is that its capacitance nains constant with varying bias current but its resistance is unction of that current. Specifically, the diode's resistance nversely proportional to the magnitude of any forward bias rrent translated therethrough. Preferably, diode 28 takes : form of a PIN diode which is a planar-passivated silicon vice capable of functioning at frequencies well into the crowave region. By varying the forward bias current ough a PIN diode, its resistance may be made to vary from entially zero to over 10,000 ohms.

A pair of RF input terminals 29 are provided to facilitate the plication of a received television signal to the variable at- uator. The lower terminal 29 is grounded while the upper ' input terminal is connected to junction 26. In a conven- nal television receiver the antenna is coupled to the tuner's ›ut via, in the order named, a 300-ohm balanced transmis- n line, a balun and a high-pass filter. The balun essentially nsists of an impedance-matching transformer, the primary ıding of which has a grounded center tap, for matching the 0-ohm balanced transmission line to the unbalanced un- lanced input circuit of the RF amplifier, which must be ven by a signal source having an impedance of 75 ohms. e high-pass filter rejects all frequencies below 50 megahertz order to remove any signals that could otherwise introduce erference in the IF signal. Applicant's attenuator is eferably interposed between the filter and the tuner's input.

Junction 26 is coupled to ground via an inductance coil 32 d is connected to a circuit junction 33 through a pair of se- s-connected diodes 34, 35 which are also of the variable re- tance type and may be of the same construction as diode 28. r reasons to be appreciated, each of diodes 34 and 35 is pacitively coupled to ground and, furthermore, the connec- n between junction 26 and diode 34 is shielded from the nnection between diode 35 and junction 33. This is accom- shed by disposing both of diodes 34 and 35 within a conduc- e cylindrical-shaped sleeve 38 which in turn is mounted in aperture of a metallic shield, schematically shown by shed construction line 39, connected to ground.

Junction 33 is connected through an inductance coil 41 to itter 14, and also via a capacitor 42 to a circuit junction 43 nnected to ground through still another variable-resistance ›de 44 which is preferably of the same construction as each diodes 28, 34 and 35. Junctions 24 and 43 are intercon- cted by way of an inductance coil 45. A pair of output ter- nals 47 are provided to derive the RF signal after it has been bjected to a controlled amount of attenuation. Specifically, per terminal 47 is connected to junction 43 and the lower minal is grounded. The output terminals are to be coupled the input of the RF amplifier in the television tuner, and it tuner may take any of a variety of different forms. It may, example, be a VHF tuner designed to select only the televi- n channels in the VHF band, it may be a UHF tuner for ecting only UHF channels, or it could constitute an all- annel tuner capable of selecting any of the channels in both VHF and UHF bands.

Each of capacitors 15, 25 and 42 functions as an RF bypass pacitor, while each of coils 32, 41 and 45 serves to isolate or ck the RF signal. Hence, with respect to an RF signal ap- ed across input terminals 29, the anode of diode 28 is essen- ly at ground potential and junctions 33 and 43 will be effec- ely joined together. The RF or AC equivalent circuit of the attenuator of FIG. 1 will thus take the configuration shown in FIG. 2. Since each of diodes 28, 34, 35 and 44 constitutes a variable resistance, those diodes have been schematically depicted in FIG. 2 as adjustable resistors designated by the reference letter R with subscript numbers corresponding to the diodes that those resistors represent. Although diodes 34 and 35 actually provide two variable resistances in series, they have been shown in FIG. 2 merely as a single variable resistor labeled $R_{34,35}$.

As is clearly evident in FIG. 2, applicant's attenuator comprises a pi network having at least one current-controlled variable-resistance diode in each of its three arms. With such a pi network, minimum RF signal attenuation is effected when the series arm, containing variable resistor $R_{34,35}$, has zero or insignificant resistance, while at the same time both the input shunt arm (which includes resistor $R_{28}$) and the output shunt arm (containing variable resistance $R_{44}$) exhibit maximum resistance. Conversely, maximum signal attenuation is obtained when the series arm resistance has its maximum value while reducing each of the two shunt arm resistances to a low value. Since a television tuner's input must look back into a signal source of 75 ohms at all times, the minimum resistances of the shunt arms will be limited to 75 ohms. When the attenuator is functioning to introduce maximum attenuation, each of the two shunt arm resistances should reduce only to 75 ohms and no less in order that the input of the tuner will always see a signal source of 75 ohms.

It is, of course, not essential that two variable-resistance diodes be included in the series arm. The attenuator will still operate very effectively even in the absence of one of diodes 34, 35. One advantage of utilizing two diodes in the series arm is that the maximum resistance obtainable in that arm will be double that which can be realized by only a single diode.

The resistances in the pi network are determined by a bias arrangement, controlled by the applied AGC signal, which translates through each of diodes 28 and 44 forward bias current that varies directly with changes in RF signal strength, and at the same time translates through each of diodes 34, 35 forward bias current that changes inversely with received signal strength variations. The push-pull operating requirements of the series and shunt arms will thus be satisfied. An explanation of the operation of the bias means may best be facilitated by initially considering the effective construction of the attenuator circuit of FIG. 1 as to DC Emitter 14 is directly tied to junction 33, the cathode of diode 34 is grounded, junctions 24 and 43 are effectively one and the same, and the cathode of diode 28 is connected to ground. The DC equivalent circuit is shown in FIG. 3, from which it will be observed that the combination of DC source 21 and resistors 19, 22 and 23 provide a voltage divider for applying a forward bias voltage to each of diodes 28, 44 to translate forward bias current therethrough. The value of resistor 22 is selected not only to develop the required bias currents but also to prevent any parasitic oscillations. Transitor 10 effectively functions as a variable-resistance device, presenting an output resistance (between its emitter and collector) and that varies inversely with its collector current. The series arrangement of transistor 10 and diodes 34 and 35 is connected across a portion of the voltage divider. The collector current serves as forward bias current for each diode in the series arm.

It will be noted in FIG. 3 that the bias arrangement provides separate DC paths for the three arms of the pi network. Specifically, the DC path between emitter 14 and ground contains the series arm diodes 34 and 35, another DC path from junction 24 through diode 28 to ground is provided for the input shunt arm, and a third DC path from junction 24 through diode 44 to ground exists for the output shunt arm. By featuring separate DC paths for the three arms, impedance matching of the attenuator to its RF signal source and also to the tuner is simplified. Flexibility in design is achieved.

As mentioned previously, the illustrated attenuator requires an AGC signal voltage which is always of positive polarity and varies in amplitude inversely with changes in RF signal strength. Under weak signal conditions, the AGC signal voltage has its maximum positive value, whereas the reception of strong RF signals results in a decrease of the AGC voltage to its minimum positive amplitude. By an appropriate selection of the parameters of the attenuator, the magnitude of DC potential source 21, and the potential range over which the AGC signal voltage varies, transistor 10 may be driven to saturation during weak signal conditions and to cut off under strong signal conditions. Between those two extremes, a variable collector current flows through the emitter-collector conduction path of the to present a variable output resistance. When the transistor is saturated, its output resistance is essentially zero and maximum forward bias current is drawn through the series arm diodes 34, 35. As a consequence, the series arm resistance decreases to substantially zero. Since this relatively high current also flows through resistor 19, the potential at collector 18 is reduced to a very low level with the result that relatively little, if any, forward bias current flows through each of the shunt arm diodes and they will exhibit their maximum resistances.

Thus, during weak signal reception the attenuator has a high shunt resistance but yet has practically no series resistance and this means that an RF signal applied to input terminals 29 will suffer negligible attenuation in passing through the attenuator. Since the series resistance is zero at that time, the impedance seen by the input of the tuner will be that presented by the signal-translating network (namely, the balun and high-pass filter) connected to terminals 29, and that impedance will be 75 ohms.

When strong RF signals are received and transistor 10 is cut off, no current flows through the series arm diodes causing their resistances to exhibit their maximum values. Meanwhile, the absence of collector current effects an increase (in a positive direction) of the potential at collector 18 thereby increasing the bias current through each of the shunt arm diodes. The shunt arm resistances therefore reduce to their minimum value of 75 ohms so that the tuner's input will see an impedance of 75 ohms even under the strongest signal conditions.

As the RF signal strength varies over the range between weak and strong, causing transistor 10 to present a variable resistance, the bias currents through the three arms of the pi network will appropriately change in order that a variable amount of attenuation is introduced to effectively regulate the gain of the television receiver to the extent desired. By a proper selection of parameters, the impedance presented to the tuner's input will always be 75 ohms no matter the amount of attenuation imparted to the RF signal.

As stated previously, the employment of two diodes in the series arm increases the maximum attenuation obtainable. There is also another very important advantage. The maximum attenuation that can be obtained is limited by the signal leakage across each diode as its resistance approaches the maximum attainable. Each of diodes 34, 35 may exhibit some undesirable intrinsic shunt capacity which could provide a bypass leakage path for the RF signal, particularly when the frequency of the RF signal is in the UHF region. This would have a deleterious effect under strong signal conditions when maximum attenuation is desired. By utilizing two diodes in series, the shunt capacity in the series arm is effectively reduced to only one-half of that existing when only one diode is used and this substantially decreases the signal leakage via the bypass route. Minimizing the shunt capacitance in the series arm maximizes the attenuation that may be realized with the attenuator.

By capacitively coupling diodes 34 and 35 to ground (by means of conductive sleeve 38 which is grounded by way of metallic shield 39) a still further increase in the maximum obtainable attenuation is achieved. The intrinsic shunt capacitance existing around each of the diodes, in conjunction with the capacitance to ground provided by sleeve 38, form a capacity voltage divider so that only a portion of the RF signal, that may otherwise reach the output terminal of the series arm, actually reaches that terminal.

Sleeve 38 also constitutes a faraday shield to reduce an capacitive leakage across the diodes due to proximity of th input and output leads at this point. Thus, the maximur realizable attenuation is greatly enhanced or augmented b the provision of grounded sleeve 38.

An additional increase in maximum attenuation i facilitated by grounded shield 39. Inductive coupling effec tively shunting the series arm may exist and that couplin could provide a bypass path around diodes 34 and 35, thereb reducing the maximum attenuation that could be effected i the absence of such coupling. When translating televisio signals in the UHF range, a significant amount of inductiv coupling may prevail. Shield 39 precludes or at leas minimizes any inductive coupling to the output lead of the se ries arm. While the shield is schematically shown in FIG. merely as a planar wall, the most effective shielding is ob tained when all of the components of the attenuator, with th exception of coil 41, capacitor 42 and diode 44, are mounte and contained within a metallic box-shaped housing or enclo sure which is grounded and completely shields all of the en closed components. Shield 39 would constitute one of th walls of the housing.

Instead of employing applicant's attenuator prior to th tuner, it could be interposed between the tuner's output an the input of the IF amplifying channel. Moreover, it coul even be inserted between a pair of successive IF amplifier. When it is used subsequent to the tuner, the carriers to be a tenuated will be IF rather than RF carries. Functioning at th considerably lower frequency, IF carriers has its advantage since any undesired inductive coupling or shunt capacitance will have less effect on the attenuator's operation.

Of course, if desired a plurality of attenuators could be in corporated in a television receiver to increase the range o signal strength over which gain regulation is maintained. Fo example, in a television receiver of the conventional typ wherein two different tuners are utilized to cover the VHF an UHF bands, and where the output of the UHF tuner is couple to an input of the VHF tuner, one variable attenuator may b employed in front of the VHF tuner, another may precede th UHF tuner, and still a third variable attenuator could be inte posed between the VHF tuner's output and the IF channel input. Even where there are both VHF and UHF tuners, on one variable attenuator need be employed in front of the tu ners. A diplexer antenna system can be used and the attenua tor may be inserted in the common antenna system.

With applicant's attenuator there will be an improvement cross modulation, namely modulation of desired signals by un desired signals. Such cross modulation is independent of th strength of the desired signal, but is directly proportional the square of the strength of the undesired signal. By attenua ing both of the signals before they reach the tuner, the u desired signal is attenuated so that its interference potential greatly reduced.

The invention provides, therefore, a novel AGC variable a tenuator capable of adequately attenuating a carrier sign even in the presence of relatively wide fluctuations in th strength of that carrier. It represents a constant impedan with respect to its load circuit regardless of the attenuatio level at which it is operating.

While a particular embodiment of the invention has bee shown and described, it is obvious to those skilled in the a that changes and modifications may be made without depar ing from the invention in its broader aspects, and therefore, is intended in the appended claims to cover all such modific tions and changes as may follow within the true spirit an scope of the invention.

I claim:

1. A variable attenuator for a wave signal receiver for a tenuating a received carrier in response to an AGC signal a in an amount directly proportional to the carrier's sign strength, comprising:

a pi network having at least one current-controlled variab resistance diode in its series arm and also having a cu rent-controlled variable-resistance diode in each of input and output shunt arms, the resistance of each diode being inversely proportional to the magnitude of any forward bias current translated therethrough;

three different DC paths from a fixed bias source to a ground plane of reference potential each of which paths includes a respective one of the three arms of said network;

bias means, controlled by said AGC signal and including said DC paths, for translating through each of the diodes in said shunt arms forward bias current that varies directly with received signal strength variations and for translating through each diode in said series arm forward bias current that changes inversely with received signal strength variations; and means for applying said carrier across said input shunt arm and means for deriving it in attenuated form across said output shunt arm.

2. A variable attenuator according to claim 1 in which said series arm includes a plurality of variable-resistance diodes series-connected in aiding polarity to minimize the capacitance of said series arm thereby to maximize the attenuation obtainable with said attenuator.

3. A variable attenuator according to claim 1 in which said bias means includes a variable-resistance device connected in series in one of said DC paths, and in which said AGC signal controls said variable-resistance device to simultaneously vary the direct current in all three of said DC paths.

4. A variable attenuator for a wave signal receiver for attenuating a received carrier in response to an AGC signal and by an amount directly proportional to the carrier's signal strength, comprising:

a pi network having at least one current-controlled variable-resistance diode in its series arm and also having a current-controlled variable-resistance diode in each of its input and output shunt arms, the resistance of each diode being inversely proportional to the magnitude of any forward bias current translated therethrough;

means including a voltage divider for applying a forward bias voltage to each of the diodes in said shunt arms to translate forward bias current therethrough;

a series arrangement, including a variable-resistance device and said series arm, connected across a portion of said voltage divider for translating forward bias current through each diode in said series arm;

means for applying said AGC signal to said variables resistance device to vary the bias current in the diodes in said shunt arms directly with received signal-strength variations and to vary the bias current in each diode in said series arm inversely with received signal strength variations; and and means for applying said carrier across said input shunt arm and means for deriving it in attenuated form across said output shunt arm.

5. A variable attenuator according to claim 4 in which said shunt arms, as to DC are connected in parallel, and in which that parallel combination is connected across part of said portion of said voltage divider.

6. A variable attenuator according to claim 4 in which said variable-resistance device is a transistor having a base, an emitter and a collector, and in which the emitter-collector conduction path of said transistor is connected in series with said series arm.

7. A variable attenuator according to claim 4, in which said series arm includes two current-controlled variable-resistance diodes connected in series with aiding polarity.

8. A variable attenuator according to claim 4, in which said bias means includes transistor with base, emitter and collector electrodes, said AGC signal is applied to said base electrode, and the variable-resistance diodes in said shunt arms are connected to one of the remaining electrodes of said transistor while the diodes or diodes in said series arm are connected to the other of such remaining electrodes.

9. A variable attenuator according to claim 4, which further comprises means for minimizing leakage reactance in said series arm to maximize the attenuation obtainable with said attenuator.